(12) United States Patent
Machauer et al.

(10) Patent No.: US 10,055,374 B2
(45) Date of Patent: Aug. 21, 2018

(54) PARTICIPATING STATION FOR A BUS SYSTEM AND METHOD FOR DATA TRANSMISSION IN A BUS SYSTEM

(71) Applicant: Robert Bosch GmbH, Stuttgart (DE)

(72) Inventors: Ralf Machauer, Ludwigsburg (DE); Simon Weissenmayer, Flein (DE)

(73) Assignee: Robert Bosch GmbH, Stuttgart (DE)

(*) Notice: Subject to any disclaimer, the term of this patent is extended or adjusted under 35 U.S.C. 154(b) by 48 days.

(21) Appl. No.: 15/071,239

(22) Filed: Mar. 16, 2016

(65) Prior Publication Data
US 2016/0275032 A1  Sep. 22, 2016

(30) Foreign Application Priority Data
Mar. 16, 2015 (DE) .................. 10 2015 204 714

(51) Int. Cl.
| | | |
|---|---|---|
| *G06F 13/40* | (2006.01) | |
| *G06F 13/36* | (2006.01) | |
| *G06F 13/368* | (2006.01) | |

(52) U.S. Cl.
CPC .......... *G06F 13/4022* (2013.01); *G06F 13/36* (2013.01); *G06F 13/368* (2013.01); *G06F 13/4063* (2013.01)

(58) Field of Classification Search
None
See application file for complete search history.

(56) References Cited

U.S. PATENT DOCUMENTS

| | | | | |
|---|---|---|---|---|
| 6,448,671 B1* | 9/2002 | Wallace | .................. | B60R 21/01 |
| | | | | 307/10.1 |
| 6,690,197 B2* | 2/2004 | Brugger | .............. | G06F 13/4068 |
| | | | | 326/21 |
| 6,700,823 B1* | 3/2004 | Rahman | .............. | H04L 25/0274 |
| | | | | 365/154 |
| 7,541,830 B2* | 6/2009 | Fahrbach | ............ | G06F 13/4086 |
| | | | | 326/30 |

(Continued)

FOREIGN PATENT DOCUMENTS

| | | | | |
|---|---|---|---|---|
| FR | 2990311 A1 | * | 11/2013 | ......... H04L 25/0278 |
| JP | 2002084283 A | * | 3/2002 | |
| WO | WO 2013164533 A1 | * | 11/2013 | ......... H04L 25/0278 |

OTHER PUBLICATIONS

'Introduction to the Controller Area Network (CAN)' Application Report SLOA101, Texas Instruments, Aug. 2002.*

(Continued)

*Primary Examiner* — Steven Snyder
(74) *Attorney, Agent, or Firm* — Maginot, Moore & Beck LLP

(57) ABSTRACT

A participating station for a bus system and a method for data transmission in a bus system are provided. The participating station comprises a transceiver unit for transmitting a message to and/or receiving a message from a further participating station of the bus system, and a switching unit for switching a connection to at least one further participating station of the bus system between an open and a closed state, wherein the switching unit is designed for the selective connection control of the participating station to at least one further participating station of the bus system on the basis of at least a part of the message received from the transceiver unit.

9 Claims, 5 Drawing Sheets

(56) References Cited

U.S. PATENT DOCUMENTS

| | | | | |
|---|---|---|---|---|
| 7,609,127 B2* | 10/2009 | Toh | .................... | H03K 17/6257 |
| | | | | 327/503 |
| 7,746,114 B2* | 6/2010 | Nagase | ............. | H04L 12/40182 |
| | | | | 326/26 |
| 8,975,915 B2* | 3/2015 | Astrom | ............. | H04L 12/40006 |
| | | | | 326/34 |
| 9,229,889 B2* | 1/2016 | Biskup | .................... | G06F 13/20 |
| 9,514,086 B2* | 12/2016 | Biskup | ................ | G06F 13/4282 |
| 9,577,601 B2* | 2/2017 | Kristiansen | ......... | G06F 13/4081 |
| 2001/0004751 A1* | 6/2001 | Necker | ............... | G06F 11/0796 |
| | | | | 710/305 |
| 2002/0095542 A1* | 7/2002 | Brugger | ............. | G06F 13/4068 |
| | | | | 710/316 |
| 2004/0030969 A1* | 2/2004 | Kuramochi | ........ | G05B 19/0428 |
| | | | | 714/712 |
| 2006/0132170 A1* | 6/2006 | Fahrbach | ............ | G06F 13/4086 |
| | | | | 326/30 |
| 2009/0121776 A1* | 5/2009 | Nagase | ............. | H04L 12/40182 |
| | | | | 327/434 |

OTHER PUBLICATIONS

'Verifying Worst Case Delays in Controller Area Network' by Nikola lykoyic et al., 2012.*

'Ringing suppression in CAN FD networks' by Islinger and Mori at Denso Automotive Deutschland, CAN Newsletter, Mar. 2016.*

* cited by examiner

PARTICIPATING STATION FOR A BUS SYSTEM AND METHOD FOR DATA TRANSMISSION IN A BUS SYSTEM

This application claims priority under 35 U.S.C. § 119 to application no. DE 10 2015 204 714.8, filed on Mar. 16, 2015 in Germany, the disclosure of which is incorporated herein by reference in its entirety.

BACKGROUND

The present disclosure relates to a participating station for a bus system and a method for data transmission in a bus system.

Driving systems are currently being developed in which vehicles travel on public roads autonomously or without human intervention in individual steering, braking or acceleration procedures. During this development, increasingly influential driving assistance functions are being installed in the vehicles for completely autonomous driving of the vehicles. The driving assistance functions control individual driving situations in a targeted manner, such as e.g. parking, stop-and-go, freeway driving, etc., and must be reliably available. This imposes stringent requirements on the data transmission rate between the control devices.

The CAN bus system, for example, can be used for communication between sensors and control devices in vehicles, in particular automobiles. With the CAN bus system, messages are transmitted by means of the CAN and/or CAN FD protocol as described in the current ISO-CD-11898-1 as the CAN protocol specification with CAN FD.

The data transmission becomes even more reliable if a further bus is installed along with the established CAN bus. Signals can then be transmitted redundantly via both bus lines, as in the case of FlexRay, for example. In the case of a redundant installation of this type, an electrical fault in one of the two buses does not result in complete communication failure.

For example, it is possible to connect four control units redundantly via two CAN buses as participating devices or participating stations of the bus system in order to transmit the signals redundantly between the control units. It is also possible here for three further control units to be connected to one of the two redundant CAN buses. As a result, these three further control units can similarly participate, albeit not redundantly, in the communication.

A bus architecture of this type has weaknesses, particularly if a large number of long spur lines are installed to the control units as participating stations. This is the case, for example, if the participating stations are connected to the bus from a central point, such as a switch, in a star configuration. Long spur lines generate reflections and reduce the maximum transmission rates, particularly in the case where CAN FD is used. In order to avoid long spur lines, both bus lines are frequently looped through, i.e. into the control unit, from there to the CAN participating station and are then fed out once more. As a result, more connection pins are required on the connector.

A further disadvantage arises from the fact that, according to the current ISO-CD-11898-1 as the CAN protocol specification with CAN FD, following the arbitration for the following part of the bus message, a completely different modulation can be used in order to increase the data rate. For example, a switchover to the Ethernet Physical Layer is possible following the arbitration. However, spur lines are unsuitable due to the reflections, particularly for transmission by means of amplitude modulation at a high transmission rate.

A further disadvantage consists in the fact that messages intended for individual bus participants only are also always picked up by all other participating stations, thereby also allowing unwanted interception and manipulation. This must be regarded as critical, particularly in the case of external devices.

SUMMARY

The object of the present disclosure is to provide a participating station for a bus system and a method for data transmission in a bus system which solve the aforementioned problems. In particular, a participating station for a bus system and a method for data transmission in a bus system are intended to be provided in which, despite a simply adaptable and low-cost bus topology, the transmission speed is increased and furthermore the transmission of messages is more secure against manipulation.

The object is achieved by a participating station for a bus system with the features of the disclosure. The participating station comprises a transceiver unit for transmitting a message to and/or receiving a message from a further participating station of the bus system, and a switching unit for switching a connection to at least one further participating station of the bus system between an open and a closed state, wherein the switching unit is designed for the selective connection control of the participating station to at least one further participating station of the bus system on the basis of at least a part of the message received from the transceiver unit.

With the participating station, the length of the spur lines for the connection from the participating stations to the bus line is reduced in favor of a higher transmission rate.

Compared with redundant bus systems with spur lines, a flexible bus topology can be achieved with the participating station, enabling a higher data rate and reduced cable weight and costs. Compared with redundant bus systems with looped-through lines, the number of connection pins of the participating station is reduced.

The aforementioned design of the participating station enables the complete elimination of participating stations with spur lines. A parallel and flexible peer-to-peer communication can therefore then be implemented. The maximum possible transmission rate is achievable with a topology of this type. Furthermore, the transmission of an Ethernet frame within a CAN message is therefore also attractive. An increase in the transmission rate can also be achieved as a result.

It is also advantageous that the flexible bus topology can be introduced gradually. Participating stations that cannot (yet) communicate in parallel are readily compatible with the flexible bus topology.

A further advantage arises in that interception is reduced with the participating station due to the flexibly adjustable parallel transmission of the data. The reason for this lies in the fact that the participating station can only ever pick up a part of the messages in the parallel (non-redundant) transmission and thus receives only half of all information. This is advantageous, above all in the case of control units as participating stations which are connected to the Internet, since the risk exists here of a participating station of this type being infected with malware and sensitive data being intercepted. The risk becomes particularly small if the data are compressed or encrypted prior to the parallelization.

Similarly, a participating station infected with malware cannot manipulate the messages unnoticed, since the intelligence of the flexible bus topology is distributed among a plurality of participating stations. In the event of attempted manipulation, only one of the two messages would reach the receiver. The other message would be blocked by the legitimate transmitter.

Advantageous further designs of the participating station are indicated in the further embodiments.

The part of the message received from the transceiver unit is possibly the identifier of a CAN message.

It is also conceivable for the transceiver unit to be designed to instigate a switching of the switching unit in order to set up the connection to at least one further participating station of the bus system depending on a predefined allocation rule relating to the identifier of the received message.

The transceiver unit may also be designed to transmit a part of the message following the identifier, after the selective connection control has been performed with the switching unit.

The participating station may furthermore be designed to switch the switching unit to a state for setting up the connection to the participating stations of the bus system following the expiry of a predefined time period since the selective connection control. Here, the predefined time period may be a time period for receiving a part of the message that is transmitted, while only one participating station of the bus system has exclusive, collision-free access to the bus line of the bus system.

The switching unit possibly has a make contact or a break contact to set up a connection to at least one further participating station of the bus system. Alternatively or additionally, the switching unit may also be designed to set up the connection as a serial or parallel bus to at least one further participating station of the bus system.

The switching unit is switched as required to a state for setting up the connection to at least one further participating station of the bus system in a time period in which exclusive, collision-free access of a participating station of the bus system to a bus line of the bus system is at least temporarily guaranteed.

The participating station described above may be part of a bus system which comprises at least one bus line and at least two participating stations which are interconnectable via the bus line in such a way that they can communicate with one another. Here, at least one of the at least two participating stations is a participating station described above.

The aforementioned object is furthermore achieved by a method for data transmission in a bus system according to a further embodiment. The method has the following steps: receiving, with a transceiver unit, the message transmitted on a bus line of the bus system, and switching, with a switching unit, a connection to at least one further participating station of the bus system between an open and a closed state on the basis of at least a part of the message received from the transceiver unit.

The method offers the same advantages as those previously described in relation to the participating station.

Further possible implementations of the disclosure also comprise combinations, not explicitly specified, of features or embodiments described above or below in relation to the example embodiments. The person skilled in the art will also add individual aspects as improvements or supplements to the respective basic form of the disclosure.

BRIEF DESCRIPTION OF THE DRAWINGS

Exemplary embodiments of the disclosure are presented in the drawings an are explained in more detail in the description below.

In the drawings.

DETAILED DESCRIPTION

Identical or functionally identical elements are denoted by the same reference numbers in the figures, unless otherwise indicated.

Figure 1:
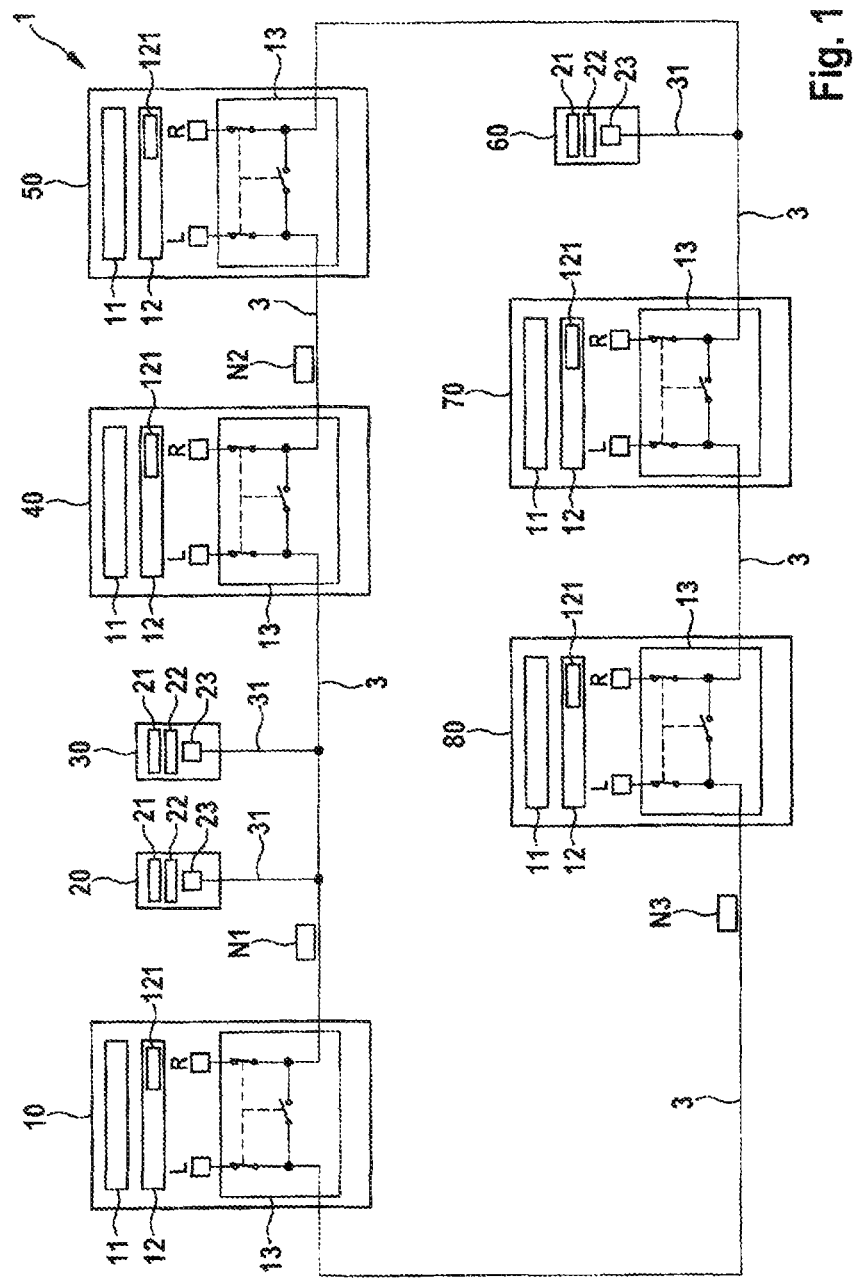
FIG. 1 shows a simplified block diagram of a bus system according to a first example embodiment.

FIG. 1 shows a bus system 1 which may, for example, be a CAN bus system, a CAN FD bus system, etc. The bus system 1 may be used in a vehicle, in particular a motor vehicle, an aircraft, etc., or in a hospital.

In FIG. 1, the bus system 1 has a bus line 3 to which a multiplicity of participating stations 10 to 80 are connected. Messages N1, N2, N3 can be transmitted via the bus line 3 in the form of signals between the individual participating stations 10 to 80. The bus line 3 is, for example, designed as a double wire or wire pair. The participating stations 10 to 80 may, for example, be control units, sensors, display units, etc. of a motor vehicle.

As shown in FIG. 1, the participating stations 10, 40, 50, 70, 80 in each case have a communication control unit 11, a transceiver unit 12, a switching unit 13 and terminating resistors L, R for the bus line 3. The participating stations 20, 30, 60, on the other hand, have a communication control unit 21, a transceiver unit 22 and a terminating resistor 23 for the bus line 3. The participating stations 20, 30 or 60 are connected via a spur line 31 of the bus line 3 to the bus line 3. The transceiver units 12 are connected in each case via the associated switching unit 13 directly to the bus line 3, even if this is not shown in FIG. 1. The transceiver units 22 are in each case connected directly to the bus line 3, even if this is not shown in FIG. 1. An allocation rule 121 is present in the transceiver unit 12, for example in a storage unit.

The communication control units 11, 21 in each case serve to control a communication of the respective participating station 10 to 80 via the bus line 3 with a different participating station of the participating stations 10 to 80 connected to the bus line 3. The communication control units 11, 21 are designed to create or read the messages N1, N2, N3. The communication control units 11, 21 may be designed as a conventional CAN and/or CAN FD controller.

The transceiver units 12, 22 are designed to transmit messages N1, N2, N3 that have been supplied by the associated communication control unit 11, 21 via the bus line 3 to a different transceiver unit 12, 22 of the bus system 1 or to supply a message N1, N2, N3 received from the bus line 3 to the associated communication control unit 11, 21. The transceiver units 12, 22 may essentially be designed as a conventional CAN and/or CAN FD transceiver. The transceiver units 12 may also have the functions described below.

Figure 2:
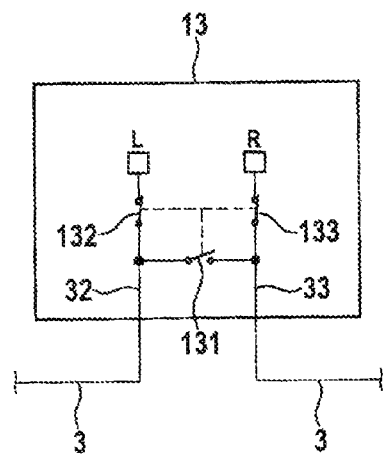
FIG. 2 shows a simplified circuit diagram of a first switching unit of a participating station of the bus system according to the first example embodiment.

FIG. 2 shows the switching unit 13 in more detail. The switching unit 13 in each case has three double switches or switches 131, 132, 133 and two terminating resistors L, R. The terminating resistors L, R serve, with a corresponding setting of the switches 131, 132, 133, to terminate the bus line 3. The switches 132, 133 are disposed in spur lines 32, 33 of the bus line 3.

In FIG. 2, the switch 131 is designed as a make contact. The switches 132, 133 are designed in FIG. 2 in each case as make contacts. In the closed state, the switch 131 can connect the part of the bus line 3 which is connectable from the left on the participating station 10 to the part of the bus line 3 which is connectable from the right on the participating station 10. The switches 131, 132, 133 are coupled to one another in such a way that a switching of one of the switches, for example the switch 131, instigates a switching of the other switches also, in the present example the switches 132, 133. This coupling of the switches 131, 132, 133 is shown in FIG. 2 by broken lines between the switches 131, 132, 133.

If the switch 131 in FIG. 2 is closed, the connection of the bus line 3 to the terminating resistor L is also interrupted due to the coupling of the switches 131, 132, 133. Furthermore, the connection of the bus line 3 to the terminating resistor R is interrupted. Consequently, the participating station 10 is disconnected from the bus line 3. No connection, or rather no data transmission connection, of the participating station 10 to the other participating stations 20 to 80 is then set up.

Conversely, if the switch 131 is open, as shown in FIG. 2, the one end of the bus line 3 connected to the switching unit 13 is terminated with the terminating resistor L due to the coupling of the switches 131, 132, 133. Furthermore, the other end of the bus line 3 connected to the switching unit 13 is terminated with the terminating resistor R. The participating station 10 can therefore exchange messages N1, N2, N3 via the bus line 3 with at least one of the other participating stations 20 to 80.

The participating stations 10, 40, 50, 70, 80, may be designed, for example, as control units. In particular, the design of the participating stations 10, 40, 50, 70, 80 described above is advantageous in a case where the participating stations 10, 40, 50, 70, 80 must otherwise be connected to the bus line 3 with a spur line 31 that is so long that the reflections caused by the spur line 31 restrict the maximum achievable data transmission rate of the bus system 1 in an unwanted manner.

Since the participating stations 20, 30, 60 have no spur line 13, the participating stations 20, 30, 60 are therefore permanently connected to the bus line 3. The participating stations 20, 30, 60 are consequently not simply disconnectable from the bus line 3 with a switch. This has disadvantages in terms of the maximum achievable data transmission rate between the new participating stations 10, 40, 50, 70, 80, but must be permitted in the process of the gradual introduction of the new participating stations 10, 40, 50, 70, 80. This may be advantageous, for example, for a simple sensor as a participating station 20, 30, 60 or for participating stations which are connected to the bus line 3 with a spur line 31 that is so short that reflections also play no part or only a negligible part in the maximum achievable data transmission rate of the bus system 1.

In the bus system 1, the participating stations 10, 40, 50, 70, 80 are flexibly interconnected or disconnected from one another by means of the switching units 13 depending on the messages N1, N2, N3 to be transmitted. Depending on requirements, a single serial bus is created from the bus line 3, or two parallel buses are created with which a redundant or parallel communication is possible.

In the case of the serial communication via a single bus, such as e.g. a serial communication of the participating station 20 with the participating station 60, the participating station 10 opens the switch 131 and terminates both bus ends of the bus line 3 by closing the two further switches 132, 133 (FIG. 2) with the terminating resistors L, R. This setting is shown in FIGS. 1 and 2. All further participating stations 40, 50, 70, 80 close their switches 131 and remove their internal terminating resistors L, R by opening their further two switches 132, 133. This is in each case the other final setting of the switches 131, 132, 133, which is not shown in FIG. 1 and FIG. 2.

In the case of the parallel communication of the participating station 80 with the participating station 50, both participating stations 50, 80 open their switches 131 and terminate all four bus ends with terminating resistors L, R by closing the switches 132, 133, as shown in FIG. 1. The participating station 10 closes the switch 131 and removes its terminating resistors L, R by opening the switches 132, 133. The same applies to the participating stations 40, 70, which similarly close their switches 131 and remove their terminating resistors L, R by opening their switches 132, 133. As a result, two independent parallel buses, in particular CAN buses, are created for the redundant data transmission.

Figure 3:
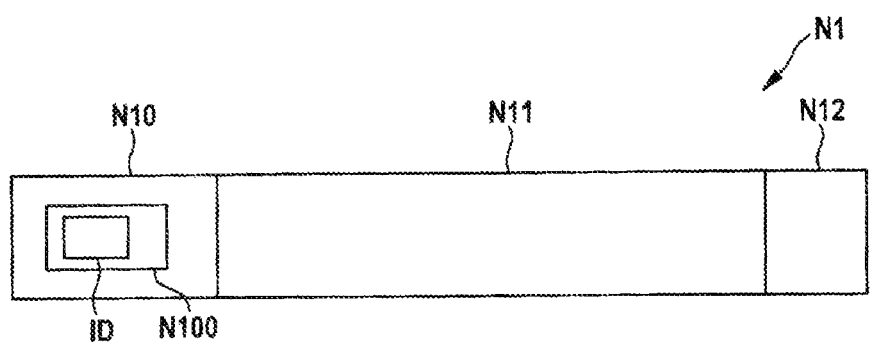
FIG. 3 shows a simplified schematic representation of the structure of a message in the bus system according to the first example embodiment.

FIG. 3 shows the structure of a message N1 in highly schematic and simplified form. The messages N2, N3 are structured in the same way as the message N1. The message N1 has a message heading N10, a data part N11 and a message end N12. An arbitration phase N100 is comprised in the message heading N10. The arbitration phase N100 in turn comprises an identifier ID of the message N1. The arbitration phase N100 is the part of the message N1 by means of which the currently transmitting participating station of the bus system 1 which, at least temporarily, receives exclusive, collision-free access to the bus line 3 of the bus system 1 is defined. The identifier ID of the message N1 can be used exclusively or inter alia in this definition. In the case of a CAN or CAN FD message as the message N1, the identifier ID is disposed immediately following an SOF bit (SOF=Start of Frame) at the start of a message N1, N2, N3.

At the beginning of each message N1, N2, N3, the bus implemented with the bus line 3 is always operated serially, i.e. all participating stations 10 to 80 are involved in the arbitration. Depending on the identifier ID of the message N1, N2, N3 of which the identifier ID has won the arbitration and which may be transmitted during a following exclusive, collision-free access to the bus line 3, all participating stations 10, 40, 50, 70, 80, close and/or open their switches 131, 132, 133 for the interconnection of the CAN participating stations 10 to 80 which are intended to receive the transmitted message from the transmitting participating station. The contents of the message N1, N2, N3 which follow the arbitration phase N100 are then transmitted. These contents are the data part N11 and the message end N12. Depending on the time period for the closing of the switches 131, 132, 133, the aforementioned contents may also comprise the part of the message heading N10 that has not yet been transmitted.

A selective, spatial connection control by means of arbitration takes place, in a manner of speaking, in the bus system 1. On completion of the arbitration, the switching units 13 are set here according to the allocation rule 121 stored in the transceiver unit 12, such as, for example, a table, and/or a query, etc. In the allocation rule 121, it is indicated whether the switches 131, 132, 133 are "open" or "closed" according to the identifier of the next transmitted message N1, N2, N3.

Figure 4:
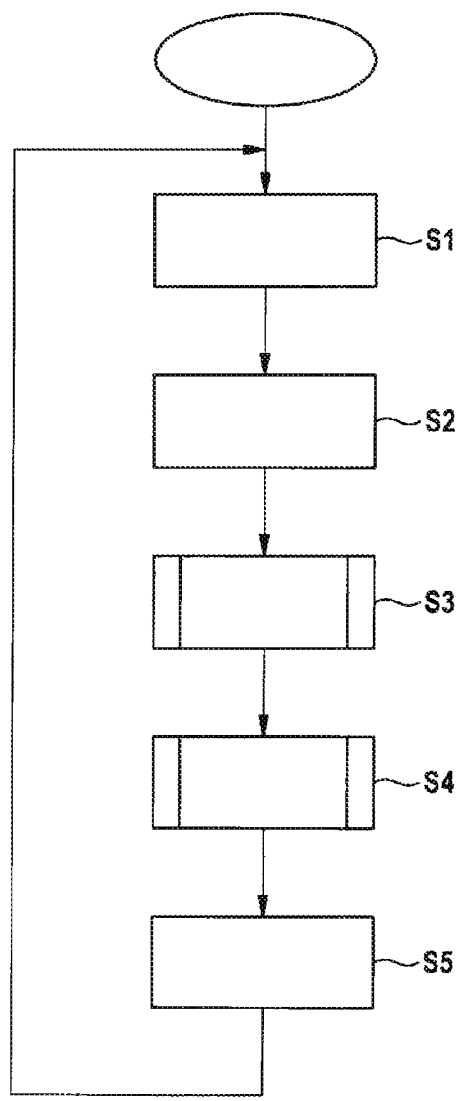
FIG. 4 shows a flow diagram of a method for data transmission in the bus system according to the first example embodiment.

FIG. 4 shows a method for data transmission in the bus system 1 according to FIG. 1 and FIG. 2. A serial bus is created here after the start of the method in a step S1 with the switching units 13, as described above. The participating stations 10 to 80 can thus receive messages N1, N2, N3 transmitted on the bus line 3 or can transmit messages N1, N2, N3 onto the bus line 3. The flow then continues to a step S2.

In step S2, for example, one or more of the transceiver units 12 of the participating stations 10, 40, 50, 70, 80 begins to transmit one of the messages N1, N2, N3 according to FIG. 3 onto the bus line 3. One or more of the transceiver units 22 of the participating stations 20, 30, 60 can simultaneously begin to transmit one of the messages N1, N2, N3 onto the bus line 3. The flow then continues to a sequence S3.

In sequence S3, a check is carried out in the transmitting transceiver unit 12, 22 to determine whether the transceiver unit 12, 22 wins the arbitration for the subsequent transmission cycle of the message N1, N2, N3. This would be the case, for example, if the transmitting transceiver unit 12, 22 is currently transmitting a message which currently has the highest priority of all messages N1, N2, N3 transmitted onto the bus line 3.

If, for example, the message N1 wins the arbitration in step S3, the associated transceiver unit 12, 22 is the only one of the previously transmitting transceiver units 12, 22 that remains in the transmitting state. All other transceiver units 12, 22 switch over to reception. The flow then continues to a sequence S4.

In sequence S4, the transceiver unit 12 switched to reception switches its switching unit 13 accordingly by means of the identifier ID of the message N1 and/or the allocation rule 121. If a transceiver unit 12 transmits the message N1, which has won the arbitration, this transceiver unit 12 also switches its switching unit 13 accordingly on the basis of the identifier ID of the message N1 and/or the allocation rule 121. The switching setting and therefore the allocation rule 121 are dependent on whether the part of the message N1 then transmitted is to be received, and/or whether the participating station is to be switched accordingly to establish a serial or parallel bus for one of the other participating stations of the bus system 1, as described above. The flow then continues to a step S5.

In step S5, the message N1 is transmitted via the bus line 3. The flow then returns to step S1.

The method is ended when the bus system 1 is switched off.

Figure 5:
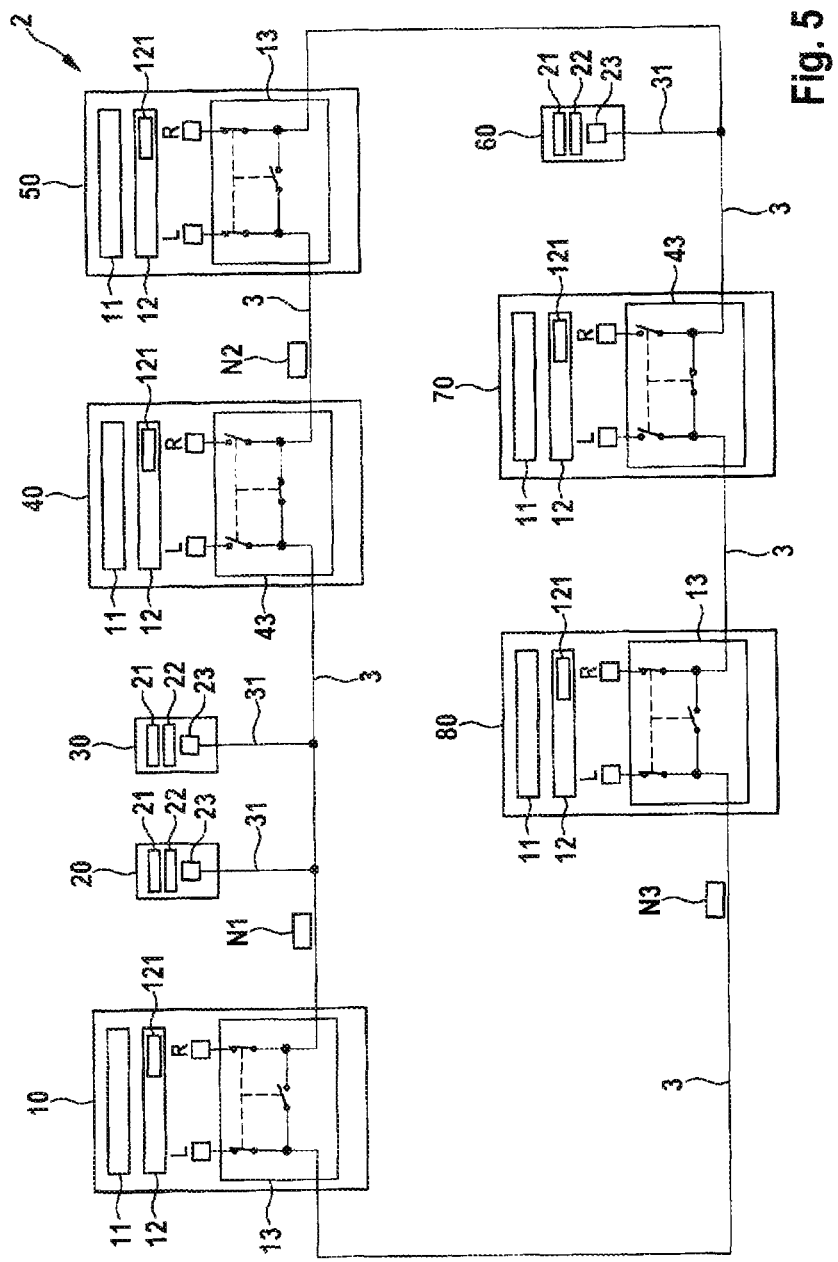
FIG. 5 shows a simplified block diagram of a bus system according to a second example embodiment.
Figure 6:
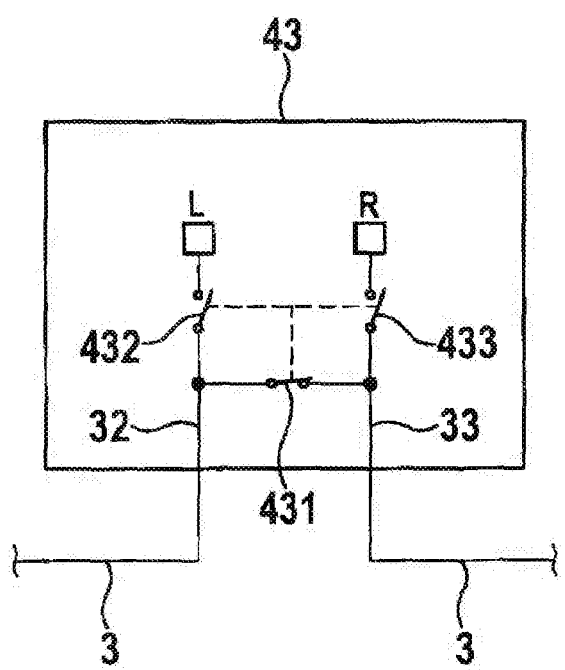
FIG. 6 shows a simplified electrical circuit diagram of a switching unit of a participating station of the bus system according to the second example embodiment.

FIG. 5 shows a bus system 2 according to a second example embodiment. Here, the participating stations 40, 70 have a switching unit 43 instead of the switching unit in the first example embodiment. The switching unit 43 is designed as shown in FIG. 6. Otherwise, the bus system 2 is designed according to a second example embodiment in the same way as the bus system 1 in the first example embodiment.

According to FIG. 6, the switching unit 43 has three switches 431, 432, 433 and two terminating resistors L, R. The terminating resistors L, R, with a corresponding setting of the switches 431, 432, 433, serve to terminate the bus line 3. The switches 432, 433 are arranged in spur lines 32, 33 of the bus line 3.

In FIG. 6, the switch 431 is designed as a break contact. In FIG. 2, the switches 432, 433 are designed in each case as make contacts. In the idle state, i.e. as shown in FIG. 6, the switch 431 can connect the part of the bus line 3 which is connectable from the left on the participating station 40 to the part of the bus line 3 which is connectable from the right on the participating station 40. The switches 431, 432, 433 are coupled to one another in such a way that a switching of one of the switches, for example the switch 431, instigates a switching of the other switches also, in the present example the switches 432, 433. This coupling of the switches 431, 432, 433 is shown in FIG. 6 by broken lines between the switches 431, 432, 433.

If the switch 431 in FIG. 2 is in the idle state, the connection of the bus line 3 to the terminating resistor L is also interrupted due to the coupling of the switches 431, 432, 433. Furthermore, the connection of the bus line 3 to the terminating resistor R is interrupted. Consequently, the participating station 40 is disconnected from the bus line 3. No connection, or rather no data transmission connection, of the participating station 40 to the other participating stations 10 to 30 and 50 to 80 is then set up.

Conversely, if the switch 431 in FIG. 6 is open, the one end of the bus line 3 connected to the switching unit 43 is terminated with the terminating resistor L. Furthermore, the other end of the bus line 3 connected to the switching unit 43 is terminated with the terminating resistor R. The participating station 40 can therefore exchange messages N1, N2, N3 via the bus line 3 with at least one of the other participating stations 10 to 30 and 50 to 80.

According to one modification of the second example embodiment, the participating stations 10, 50, 80 also have a switching unit 43 instead of a switching unit 13.

All previously described designs of the bus system 1, 2, the participating stations 10 to 80 and the method can be used individually or in all possible combinations. In particular, all features of the previously described example embodiments and/or their modifications can be combined or omitted as required. In addition, the following modifications, in particular, are conceivable.

The previously described bus system 1, 2 according to the example embodiments is described with reference to a bus system based on the CAN protocol. However, the bus system 1, 2 according to the example embodiments may also be a different type of communication network. It is advantageous, but not a mandatory requirement, that exclusive, collision-free access of a participating station 10 to 80 to a common channel is guaranteed, at least for defined time periods, in the bus system 1.

The number and arrangement of the participating stations 10 to 80 in the bus system 1 of the first example embodiment is arbitrary. Furthermore, the number and arrangement of the participating stations 10 to 80 in the bus system 2 of the first example embodiment is arbitrary. In particular, the participating stations 20 and/or 30 and/or 60 may be omitted in the bus system 1. In particular, the participating stations 20 and/or 30 and/or 60 may also be omitted in the bus system 2. Any given combinations of the participating stations 10 to 80 are possible in the bus systems 1, 2.

The switches of the switching units 13, 43 do not have to be coupled, as previously described. The switches of the switching units 13, 43 may also be individually switchable in each case.

What is claimed is:

1. A participating station for a bus system, the participating station comprising:
a transceiver unit configured to at least one of (i) transmit a message to a further participating station of the bus system and (ii) receive a message from the further participating station of the bus system; and
a switching unit connected to a first spur line and a second spur line of a bus line in the bus system, the switching unit comprising:
a first terminating resistor;
a first switch connected between the first spur line and the first terminating resistor;
a second terminating resistor;
a second switch connected between the second spur line and the second terminating resistor; and
a third switch connected between the first spur line and the second spur line, the switching unit being configured to:
open the first switch and the second switch and close the third switch simultaneously to enable a message to pass from the first spur line to the second spur line on the bus in a first configuration; and
close the first switch and the second switch and open the third switch simultaneously to enable the transceiver unit to receive and transmit messages through at least one of the first spur line and the second spur line in a second configuration.

2. The participating station according to claim 1, wherein the transceiver unit receives an identifier (ID) of a message while the switching unit is in the second configuration.

3. The participating station according to claim 2, wherein the transceiver unit is configured to operate the switching unit to switch between the first configuration and the second configuration depending on a predefined allocation rule relating to the identifier of the message.

4. The participating station according to claim 2, wherein the transceiver unit is configured to transmit a part of the message following the identifier of the message, while the switching unit is in the second configuration.

5. The participating station according to claim 4, wherein the participating station is configured to operate the switching unit to be in the first configuration to set up a connection to the further participating station of the bus system following an expiry of a predefined time period since operation of the switching unit to be in the second configuration.

6. The participating station according to claim 5, wherein the predefined time period is a time period for receiving a part of the message that is transmitted while only the other participating station of the bus system has exclusive, collision-free access to the bus line of the bus system.

7. The participating station according to claim 1, wherein the switching unit is configured to switch to the first configuration to set up a connection to the further participating station of the bus system in a time period in which exclusive, collision-free access of another participating station of the bus system to the bus line of the bus system is at least temporarily guaranteed.

8. A bus system comprising:
a bus line; and
at least two participating stations which are interconnected via the bus line in such a way that they can communicate with one another, at least one participating station of the at least two participating stations comprising:
a transceiver unit configured to at least one of (i) transmit a message to a further participating station of the at least two participating stations and (ii) receive a message from the further participating station of the at least two participating stations; and
a switching unit connected to a first spur line and a second spur line of the bus line, the switching unit comprising:
a first terminating resistor;
a first switch connected between the first spur line and the first terminating resistor;
a second terminating resistor connected between the second spur line and the second terminating resistor;
a second switch connected between the second spur line and the second terminating resistor; and
a third switch connected between the first spur line and the second spur line, the switching unit being configured to:
open the first switch and the second switch and close the third switch simultaneously to enable a message to pass from the first spur line to the second spur line on the bus in a first configuration; and
close the first switch and the second switch and open the third switch simultaneously to enable the transceiver unit to receive and transmit messages through at least one of the first spur line and the second spur line in a second configuration.

9. A method for data transmission in a bus system, the method comprising:
receiving, with a transceiver unit of a participating station, a message transmitted on a bus line of the bus system; and
switching, with a switching unit of the participating station, between a first configuration and a second configuration, the switching further comprising:
opening a first switch connected between a first spur line connected to the bus line and a first terminating resistor, opening a second switch connected between a second spur line connected to the bus line and a second terminating resistor, and closing a third switch connected between the first spur line and the second spur line in the first configuration to enable a message to pass from the first sour line to the second sour line on the bus in a first configuration; and
closing the first switch connected between the first spur line connected to the bus line and the first terminating resistor, closing the second switch connected between the second spur line connected to the bus line and the second terminating resistor, and opening the third switch connected between the first spur line and the second spur line in the second configuration to enable the transceiver unit to receive and transmit messages through at least one of the first spur line and the second spur line in a second configuration.

* * * * *

UNITED STATES PATENT AND TRADEMARK OFFICE
CERTIFICATE OF CORRECTION

PATENT NO. : 10,055,374 B2  
APPLICATION NO. : 15/071239  
DATED : August 21, 2018  
INVENTOR(S) : Machauer et al.

It is certified that error appears in the above-identified patent and that said Letters Patent is hereby corrected as shown below:

On the Title Page

On page 2, the "OTHER PUBLICATIONS" subsection of Item (56) should read:  
'Verifying Worst Case Delays in Controller Area Network' by  
Nikola Ivkovic et al., 2012. *  
'Ringing suppression in CAN FD networks' by Islinger and Mori at  
Denso Automotive Deutschland, CAN Newsletter, Mar. 2016. *

In the Claims

In Column 10, Lines 44-48, Lines 13-17 of Claim 9 should read:  
terminating resistor, and closing a third switch con-  
nected between the first spur line and the second spur  
line in the first configuration to enable a message to  
pass from the first spur line to the second spur line on  
the bus in a first configuration; and Signed and Sealed this  
Nineteenth Day of February, 2019

Andrei Iancu  
*Director of the United States Patent and Trademark Office*